Patented Nov. 10, 1931

1,831,197

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

LOW VISCOSITY CELLULOSE FIBER AND PROCESS OF MAKING

No Drawing.   Application filed January 20, 1928.   Serial No. 248,263.

In some branches of the cellulose derivative industry, e. g., in artificial silk and lacquer manufacture, it is desirable to produce cellulose derivative solutions of low viscosity. Inasmuch as the cellulose fiber usually employed as a raw material cannot be converted into derivative solutions of sufficiently low viscosity, it is customary practice to subject the fiber or the derivative to special conditioning treatment before preparing the derivative solution.

In the viscose-rayon process, the lowering of the solution viscosity of the fiber is usually effected by treating the fiber with caustic soda solution of mercerizing strength and then ageing the fiber thus treated for a considerable period of time, for instance 48 to 100 hours. Such treatment effects what is generally known as depolymerization of the cellulose, and is not only accompanied by a lowering of the solution viscosity of the fiber but also by other physical and chemical changes which may deleteriously affect the suitability of such fiber for the preparation of derivatives. Thus, during such depolymerization, undesirable side reaction products, such as oxycelluloses and other degraded celluloses, are likely to result, such products being converted along with the cellulose, contaminating the derivative, and impairing its characteristics.

The present invention relates to a process of preparing a fiber of low solution viscosity and having optimum characteristics for conversion into cellulose derivatives. I have found that a product having such optimum characteristics may be produced by subjecting cellulose fiber while in a damp or moist state, to alkaline depolymerization, but under non-mercerizing conditions, in the presence of a gaseous oxidant. I have further found that when such depolymerization is effected at elevated temperature, the depolymerizing period is much shorter than the usual ageing period in the viscose-rayon process where depolymerization is effected at relatively low temperatures, say 15° to 18° C., in order to avoid excessive formation of undesirable reaction products, and where the depolymerizing atmosphere is sometimes cooled in order to maintain these temperatures. By thus lowering the solution viscosity of fiber, the formation of undesirable side reaction products is largely avoided, so that when high grade cellulose fiber such as cotton or refined wood fiber is employed as the raw material, a depolymerized fiber of high purity and of very low solution viscosity, and hence suitable for the preparation of high grade derivatives, may be produced. For instance, by practising the process of the present invention, I may produce depolymerized fiber of high purity and at the same time having a solution viscosity as low as .1 to .3. Such fiber is not only an excellent raw material for the preparation of various derivatives such as cellulose acetate and cellulose nitrate but after conversion into soda cellulose may be xanthated into viscose syrups suitable for spinning without the usual ageing heretofore required. When nitrated, for example, it yields nitrocellulose of the so-called ½' variety directly, that is, without special treatment of the nitrated product. Such a nitrated product when treated with solvents yields high grade syrups of especially low viscosity and is thus eminently satisfactory for use in lacquer manufacture where low viscosity is a factor of considerable importance.

The process of my invention may be applied to fibers having a wide range of initial viscosities, for example fibers of a solution viscosity below the 5 to 7 range usually specified in the rayon industry, and also to fibers of a solution viscosity of 20 and even over. So, too, it may be applied to fibers such as cotton, sulphite pulp, kraft pulp, groundwood pulp, or to those derived from grasses or other origins, but if such fiber is relatively impure, it is preferable to remove non-alpha cellulose components therefrom, including ligneous and resinous matter and less-resistant celluloses, by suitable refining treatment, e. g., by the use of oxidizing or chlorinating liquors and/or acid or alkali liquors, followed by a final bleaching treatment. For instance, in cases where it is not disadvantageous to mercerize such fiber before preparing the derivative, as for instance where cellulose xanthate is being prepared, the fiber may be treated with a caustic soda solution of mercerizing strength to effect a removal of resinous and ligneous matter, pentosans, less-resistant celluloses, oxycelluloses, and other non-alpha cellulose components. Such refining treatment, or one involving the use of a liquor below mercerizing strength, must be effected with the fiber suspended in the liquor so as to permit a solution of the non-alpha cellulose components from the fiber,—this necessitating the use of many, say ten, times as much liquor by weight as fiber. Under these conditions, it is impossible to reduce the solution viscosity of the fiber to the same degree as by treating it while in a moist or damp condition, for very little effect is produced on the fiber by bubbling air or oxygen through a fiber suspension in an alkaline liquor, even in the presence of oxidizing agents such as bleach, and it is only after a very considerable treating period that a low-viscosity product is obtainable when the fiber suspension is quite strongly alkaline and at the same time contains bleach. After the refining treatment, the fiber may be washed, but in so doing it is preferable not to remove all the alkali, but to produce therein diluted alkali solution of a concentration permitting a centrifuging or pressing of the fiber to an alkali and water content suitable for alkaline depolymerization in accordance with the present invention.

The fiber may be processed according to the present invention while in any suitable physical condition, e. g., in bulk or continuous sheet form, or as separate sheets. The fiber while in any one of these conditions may be immersed in a bath of alkaline solution of suitable strength, but in no case should a solution of mercerizing strength be employed. After immersion, the fiber is reduced to a damp or moist condition, say, a liquor content twice the weight of dry fiber, and while in such condition subjected to the action of a gaseous oxidant or mixture of oxidants, e. g., air, oxygenated air, or oxygen, under suitable temperature and pressure conditions, until depolymerization and viscosity lowering have been effected to the desired extent. The depolymerizing operation may be carried out employing various alkaline compounds or mixtures of such compounds, e. g., caustic soda, ammonia, sodium carbonate, basic oxides such as lime, or other basic compounds such as tri-calcium phosphate, and in the presence of catalytic agents such as the metallic oxides. If ammonia is employed, it is unnecessary to prepare ammonia water for the immersion of the fiber, as in such case intimate contact of the ammonia with the fiber may be effected by using the ammonia in gaseous form in admixture with a gaseous oxidant and sufficient water vapor to effect the desired depolymerizating action. Various conditions of depolymerization may be maintained, for instance a temperature of from 20° to 160° C., and atmospheric or super-atmospheric pressure, the depolymerizing period in any case depending upon the particular conditions maintained in that case and varying from a period of, say, ten minutes to one of several hours. In any case where a temperature above prevailing atmospheric is employed, however, the period is much shorter than the ageing period of the usual viscose-rayon process. Depolymerization may be effected in a closed chamber, the fiber being maintained stationary or else being moved through the chamber while gaseous oxidant, preferably in admixture with sufficient water vapor to maintain the desired water content in the fiber, is passed through the chamber. If desired, the chamber may be heated, or the oxidant may be heated before being passed into the chamber, and, where ammonia gas is being passed into the chamber along with the oxidant, the gases being exhausted from the chamber may be recovered and treated with sufficient ammonia, oxygen, and moisture to make up losses, or be otherwise conditioned for re-use in the chamber.

The fiber may be handled from the beginning to the end of the process in bulk or continuous sheet form, or as separate sheets, or in two or more forms. When a continuous sheet of fiber is to be handled throughout the process, the procedure may be substantially as follows. A continuous sheet may be passed through a bath of alkaline solution to effect a permeation of the sheet with such solution. The sheet may be made from beaten fiber, in which case its thickness may range from, say, 2 to 6 mils, or it may be made from unbeaten or only slightly beaten fiber, in which case it is more porous and is thus more readily permeated by the alkaline solution and penetrated by the gaseous oxidant so that it may be expediently processed up to a thickness of, say, 200 mils. If desired, the sheet may be perforated to facilitate its permeation by the alkaline solution and penetration by the gaseous oxidant. The sheet may be passed from the bath of alkaline solution through press rolls which serve to press out excess solution, leaving an alkali and water content suitable for depolymerization, whereupon depolymerization may be effected by passing the sheet through a chamber, while being festooned for example, through which air at suitable temperature, pressure and humidity conditions is being circulated. The sheet may be maintained at an elevated temperature during depolymerization, by heating the chamber or the air being circulated therethrough, or by heating the festooning rolls over which the paper passes. In lieu of effecting depolymerization by passing the sheet through a chamber, the sheet may be passed over suitable suction or pressure boxes, or other suitable devices which serve to force air or other gaseous oxidant, at elevated temperature, if desired, through the sheet. The fiber may, however, be handled in sheet form through part of the process and then handled in bulk form through the rest of the process. For example, after the continuous sheet has been subjected to the action of the press rolls, it may be shredded or cut into small pieces and exposed while in a loose, open condition to the action of a current of air until the desired depolymerization has been effected. Such exposure may, for instance, take place while the fiber is being moved as a continuous stream through a tunnel or sluice in counterflow and in contact with a stream of air, under super-atmospheric pressure, if desired. If desired, the fiber may be handled in bulk form throughout the process. For instance, pulp may be fluffed to resemble cotton linters, then submerged in a bath of alkaline solution, then reduced to the desired alkali and water content by means of a centrifuge, suction roll, or other suitable device, whereupon the moist fiber may be disintegrated into a loose, open mass of flocks and exposed to the action of air under the desired conditions.

After depolymerization, the fiber may be washed free of alkali and converted into derivatives, but if caustic soda has been employed as the depolymerizing agent and cellulose xanthate is the derivative to be prepared, the caustic soda need not be washed out, the fiber in such case being treated with caustic soda solution of mercerizing strength to produce soda cellulose and then being xanthated without any ageing whatever. If ammonia has been employed as the alkaline depolymerizing agent, washing may also be dispensed with, if desired, as the ammonia contained in the fiber may be driven off and recovered by simply heating the fiber, the driving off of the ammonia being accelerated by maintaining the fiber under vacuum conditions, if desired. Or if cuprammonium cellulose is to be prepared, the ammoniated fiber may be converted directly into this derivative without washing. If the depolymerized fiber is in bulk condition, it may be washed by any of the usual pulp washers and then dewatered or dried; if it is in continuous sheet form, it may be washed, as by passing it through a water bath, then dried, and finally rolled up. Washing of the fiber may be effected with hot water and/or in the presence of heat to produce a hot, dilute alkaline solution of the alkali carried by the fiber, and thus to promote a solution of undesirable reaction products which may have been produced during depolymerization. When the color of the fiber has been affected by depolymerization and/or by washing, the fiber may be treated with a dilute bleach solution after washing and/or a small amount of bleach may be added to the wash water The yield of depolymerized fiber obtained will vary in different cases, depending upon the characteristics of the fiber employed as a raw material and also upon the chemical treating which it has received in addition to depolymerization. When cotton fiber or a high alpha cellulose wood fiber is employed as a raw material, only a small loss of material is suffered, as such fiber requires little if any, refining to yield a pure, depolymerized product, but when sulphite, kraft, or ground-wood pulp or other relatively impure cellulosic fiber is employed as a raw material, there may be a loss of from 15% to 35% of the raw material, depending upon the degree of refining to which such fiber has been subjected.

To appreciate applicant's invention, certain specific examples of procedure will be given. In these examples, a white high alpha cellulose wood fiber, having a solution viscosity of from 5 to 6, was employed in unbeaten condition and in the form of relatively thin sheets as a raw material, but, as previously stated, fibers of other viscosity and origin and in other suitable form may be used. These sheets were soaked for a very short period of time (one to two minutes) in a 3% NaOH solution at room temperature, and were then freed of excess solution by pressing until the sheets were approximately three times as heavy as the dry sheets originally used, indicating a solution content of about twice their fiber content. The moist sheets were then depolymerized by exposure for about 30 minutes to air currents heated to about 100° C., with the sheets arranged to permit free circulation of the air to take place over substantially all the sheet surface. The depolymerized sheets were then disintegrated and washed in water to remove alkali and soluble decomposition products contained therein. The washed fiber was brightened in color with a very small quantity of bleach, about 0.1% to 0.2% based on fiber. The product when washed and tested showed a solution viscosity of 0.3. Such a product may be converted into high grade cellulose derivatives and when converted into soda cellulose may be xanthated without ageing. Where the depolymerized sheets of fiber are to be converted directly into cellulose xanthate, washing of the fiber need not be effected, as the sheets may be converted into soda cellulose by dipping them in caustic soda solution of mercerizing strength, and then xanthated, but if the sheets are to be stored or shipped over a considerable period of time before conversion, the fiber is preferably washed free of alkali, owing to the tendency of the alkali to produce side reaction products during such time. In the example given, the strength of depolymerizing solution may be varied, solutions of 1% to 5% strength having been found most satisfactory, and there being a more marked tendency of producing side reaction products as the strength of solution goes above 5%. If desired, bleaching may be effected in the presence of a slight amount of alkali, as under such conditions a more selective action upon coloring materials takes place. Another example of procedure, but using ammonia as the depolymerizing agent was substantially as follows. Thin paper sheets, similar to those employed in the example previously given were confined in a moist atmosphere containing 50% ammonia gas and 50% air at 100° C. for a five-hour period. Under such conditions, a product having a solution viscosity of about 0.5 was obtained. It is thus seen that depolymerization may be effected by a single step where ammonia is employed. The ammonia contained in the depolymerized sheets may be removed by washing or heating the sheets, but if cuprammonium cellulose is to be directly prepared therefrom, the sheets may be removed from confinement and delivered directly into the cuprammonium cellulose converter. The percentages of ammonia and air in the depolymerizing atmosphere, as well as its moisture content, may be varied, it being possible to effect the desired depolymerization with as low as 10% ammonia and 90% air, and vice versa. The period of depolymerization is greater when either ammonia or air greatly predominates, than when the percentages of these components are nearer equal.

While the foregoing examples have to do with procedures in which either caustic soda or ammonia serves alone as the alkaline depolymerizing agent, as previously stated, more than one alkaline agent may be employed in the same depolymerizing operation, if desired. For instance, the fiber may first be immersed while in bulk or sheet condition in a caustic soda solution of say, about 1%, then reduced in solution content until it is damp or moist, as previously described, and then subjected to depolymerization at the desired temperature in an atmosphere comprising ammonia and air until its solution viscosity has been lowered to the desired degree.

The process of the present invention makes possible a more rapid production of fiber of low solution viscosity than is possible by the use of solutions of mercerizing strength. Such production may be effected with an economy of chemicals, for the process calls for the use of dilute chemical solutions and lends itself to easy control and continuous practice. Moreover, a product of higher purity may be produced and with a greater diversity of chemicals than has heretofore been possible.

The term "solution viscosity" as applied to cellulose fiber is an arbitrary one, indicative of the viscosity of a cellulose derivative solution preparable therefrom. The solution usually and herein employed as a standard is a cuprammonium cellulose solution of prescribed cellulose concentration, the viscosity being determined by measuring the time of efflux of a definite volume of such solution under standard conditions, through an orifice of standard size. The solution viscosity of fiber is herein given in absolute C. G. S. units, and is determined by measuring the viscosity of a solution of 6 grams of fiber in a cuprammonium solution composed of 225 cc. of 28% ammonia water containing 9 grams of cuprous oxide. The C. G. S. unit is employed because it is definite, denoting a viscosity 100 times that of water at 20° C., wherefore a cuprammonium cellulose solution of standard composition identifying a fiber as having a solution viscosity of 10 to 1000 times as viscous as water at 20° C. Glycerine, which is often referred to when dealing with solution viscosity of cellulose fiber, has a value of between 8 and 10 units.

Having thus described certain embodiments of this invention, it should be obvious to those skilled in the art that various changes and modifications might be made therein without departing from the spirit or scope of invention as set forth in the appended claims.

What I claim is:

1. A process which comprises depolymerizing damp cellulose fiber in the presence of alkali below mercerizing strength and oxygen-containing gas.

2. A process which comprises depolymerizing cellulose fiber while in a loose, open condition in the presence of alkali below mercerizing strength and oxygen-containing gas carrying water vapor.

3. A process which comprises depolymerizing damp cellulose fiber while in a loose, open condition in the presence of alkali below mercerizing strength and air.

4. A process which comprises depolymerizing damp cellulose fiber while in a loose, open condition in the presence of alkali below mercerizing strength and oxygen-containing gas carrying water vapor.

5. A process which comprises depolymerizing damp cellulose fiber in the presence of alkali below mercerizing strength and oxygen-containing gas, and converting the depolymerized fiber into a cellulose derivative.

6. A process which comprises depolymerizing damp cellulose fiber in the presence of alkali below mercerizing strength and oxygen-containing gas, and then removing the alkali from the depolymerized fiber.

7. A process which comprises depolymerizing damp cellulose fiber in the presence of alkali below mercerizing strength and oxygen-containing gas, and washing the alkali from the depolymerized fiber.

8. A process which comprises depolymerizing damp cellulose fiber in the presence of alkali below mercerizing strength and oxygen-containing gas, and bleaching the depolymerized fiber.

9. A process which comprises depolymerizing damp cellulose fiber in the presence of alkali below mercerizing strength, and bleaching the depolymerized fiber in the presence of alkali.

10. A process which comprises immersing cellulose fiber in caustic soda solution below mercerizing strength, removing solution from the fiber in excess of that required to keep the fiber in damp condition, and depolymerizing the fiber while in such condition in the presence of oxygen-containing gas.

11. A process which comprises immersing cellulose fiber in caustic soda solution of about 1% to 5% strength, removing from the wet fiber sufficient solution to produce a solution content of about twice its fiber content, and depolymerizing the fiber while in such condition in the presence of oxygen-containing gas.

12. A process which comprises depolymerizing damp cellulose fiber in the presence of caustic soda below mercerizing strength and oxygen-containing gas, converting the depolymerized fiber into soda cellulose, and preparing cellulose xanthate directly from such soda cellulose.

13. A process which comprises depolymerizing cellulose fiber while in a damp condition in the presence of more than one alkali.

14. A process which comprises depolymerizing damp cellulose fiber in the presence of ammonia and another alkali.

15. A process which comprises depolymerizing damp cellulose fiber in the presence of caustic soda and ammonia.

16. A process which comprises depolymerizing damp cellulose fiber in the presence of ammonia gas and oxygen-containing gas.

17. A process which comprises depolymerizing damp cellulose fiber in the presence of a mixture of ammonia gas and oxygen-containing gas carrying water vapor.

18. A process which comprises depolymerizing damp cellulose fiber in the presence of a mixture of ammonia gas, air, and water vapor.

19. A product consisting of unmercerized cellulose fiber of high alpha cellulose content and of a solution viscosity less than 1.

20. A paper consisting of unmercerized cellulose fiber having a solution viscosity of less than 1.

21. A paper consisting of cellulose fiber of high alpha cellulose content and of a solution viscosity less than 1.

22. A process which comprises suspending cellulose fiber in caustic soda solution to effect its purification, incompletely washing the fiber to leave residual dilute caustic soda solution therein, removing solution in excess of that required to maintain the fiber in damp condition, and depolymerizing the fiber while in such condition in the presence of oxygen-containing gas.

23. A process which comprises depolymerizing damp cellulose fiber in the presence of alkali below mercerizing strength and oxygen-containing gas, and heating up to about 160° C. during such depolymerization.

24. A process which comprises depolymerizing damp cellulose fiber in the presence of ammonia gas, air, and water vapor, and heating up to about 160° C. during such depolymerization.

25. A product consisting of cellulose fiber of high alpha cellulose content and of a solution viscosity less than 1.

In testimony whereof I have affixed my signature.

GEORGE A. RICHTER.